(12) United States Patent
Vermoortele et al.

(10) Patent No.: US 6,464,772 B1
(45) Date of Patent: Oct. 15, 2002

(54) BISMUTH-BASED PIGMENTS AND PROCESS FOR THEIR MANUFACTURE

(75) Inventors: Frank Vermoortele, Marq en Baroeuil (FR); Emile Joseph Buyse, Mouscron (BE)

(73) Assignee: Gebroeders Cappelle N.V., Menen (BE)

( * ) Notice: Subject to any disclaimer, the term of this patent is extended or adjusted under 35 U.S.C. 154(b) by 34 days.

(21) Appl. No.: 09/716,657

(22) Filed: Nov. 20, 2000

(30) Foreign Application Priority Data

Nov. 22, 1999 (EP) .............................. 99870240

(51) Int. Cl.⁷ ..................... C04B 14/00; C01B 9/00; B32B 9/00
(52) U.S. Cl. ..................... 106/479; 428/403; 428/404; 428/462; 428/468; 428/472; 428/466
(58) Field of Search ..................... 106/479; 428/403, 428/404; 423/462, 468, 472, 466

(56) References Cited

U.S. PATENT DOCUMENTS

| 4,230,500 A | | 10/1980 | Balducci et al. |
| 4,252,570 A | * | 2/1981 | Shannon ..................... 106/479 |
| 5,958,126 A | | 9/1999 | Adel et al. |

* cited by examiner

*Primary Examiner*—Elizabeth D. Wood
(74) *Attorney, Agent, or Firm*—Knobbe, Martens, Olson & Bear, LLP

(57) ABSTRACT

The present invention relates to very durable bismuth-based inorganic pigments with a light vivid yellow to orange color corresponding to the following general formula:

$$BiV_{(1-n)}X_nO_{(4-3n)}$$

in which X is a halogen or a mixture of halogens and n can vary from 0 to 1.

The invention also relates to the process for the manufacture of such pigments.

18 Claims, No Drawings

BISMUTH-BASED PIGMENTS AND PROCESS FOR THEIR MANUFACTURE

This application claims priority of European application EP 99870240.1, filed Nov. 22, 1999.

The present invention relates to bismuth-based pigments exhibiting greatly improved coloring and resistance characteristics.

The invention also relates to the process for producing these pigments and to their application, in particular in the coloring of paints, lacquers and/or plastics.

Technological Background and State of the Art

Bismuth vanadate is a yellow inorganic pigment well known (DE 422447, U.S. Pat. No. 3,843,554, U.S. Pat. No. 4,115,142, JP 62277485 and DE 19733584) for coloring plastics and paints, as a catalyst in the oxidation of olefins, as a contrast-enhancing pigment for television screens and as a reversible temperature indicator.

However, pure bismuth vanadate (named PY184) does not make it possible to directly obtain orange colors. There thus currently exists an obvious need to have available bismuth-based inorganic pigments exhibiting, on the one hand, a color range extending from greenish yellow to orange yellow and having, on the other hand, resistance at least equal to or even superior to those of pure bismuth vanadate.

Pigments based on bismuth vanadate are nontoxic, have a vivid yellow color, have a high coloring strength and have excellent opaqueness; they are readily dispersed in their medium of use and they can be easily used in all kinds of paints (conventional, industrial, powdered).

Bismuth-based pigments with the chemical composition BiOCl are also known (U.S. Pat. No. 2,974,053, DE 3738114 and U.S. Pat. No. 3,917,671). However, these pigments are very different from pigments based on pure bismuth vanadate since they are pearlescent, off-white and rather unresistant to light. They are mainly used in the cosmetics industry for pearlescent and metallic effects.

It is also known, by Patent Application EP-A-632 110, to precipitate a fine layer of bismuth vanadate on a synthetic mica-based pearlescent pigment in order to obtain highly dispersible and very glossy pigments with a yellow hue.

A description has also been given, in Patent Application EP-A-839 874, of basic bismuth vanadates $BiVO_4 \cdot xBi_2O_3$, the yellow color of which verges on orange, either by calcining a very homogeneous mixture of bismuth and vanadium oxides or by calcining a precipitate obtained by the aqueous route in the presence of phosphate.

Other attempts have been made to obtain bismuth vanadates with a reddish hue, by doping the $BiVO_4$ crystal with very small amounts of metals (iron, rare earth metals), but the purity of color and the coloring strength of which leave something to be desired (DE 19529837).

It is also known, by Patent Application DE 197481423, to crystallize bismuth oxide $Bi_2O_3$ in a special metastable β variety by carrying out the process very rapidly in a refluxing aqueous medium in the presence of alkaline hydroxides, to isolate a reddish yellow.

A description is given, in Patent Application EP-A-816 440, of a mixture of pigmentary bismuth vanadate powders and of orange, red or orange yellow organic pigments, to obtain an orange powder which is a pigment with a hybrid inorganic-organic nature.

There also exist other possibilities for obtaining bismuth-based compounds with a darker color, for example by calcining bismuth, zirconium and chromium coprecipitates (DE 4002943).

However, none of these attempts to obtain bismuth-based orange pigments succeed in simultaneously combining the various characteristics desired for an application of a pigment, namely a pure orange color, easy application, nontoxicity and improved resistance to light, to weathering and to heat.

Aims of the Invention

The present invention aims to provide bismuth-based pigments which exhibit a sufficiently pure color of yellow to orange type and which have excellent qualities of resistance.

Another aim of the present invention is to provide bismuth-based pigments, which are easy to apply, in conventional formulations (solvents) and modern formulations (powdered, dispersed in water, with a high solids content, and the like).

An additional aim of the present invention is to provide a process for the manufacture of such pigments which is simple in conception and applicable industrially.

Characteristic Components of the Invention

The invention relates to bismuth-based pigments exhibiting a yellow to orange color composed of a yellow component based on bismuth vanadate and of an orange component based on bismuth oxyhalides which are very intimately combined.

The pigments of the invention correspond to the following general formula:

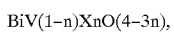
BiV(1−n)XnO(4−3n), or more particularly to the formula:

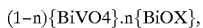
(1−n){BiVO4}.n{BiOX}, where:

X denotes a halogen selected from the group consisting of chlorine, bromine and iodine, preferably bromine or iodine, or a mixture thereof, preferably a mixture of bromine and iodine (this mixture furthermore being preferred to bromine alone or to iodine alone)

n is greater than zero and less than one (0<n<1), preferably between 0.25 and 0.40, more particularly with n=0.3, that is to say BiV(0.7)X(0.3)O(3.1), Xn can be written [Cl(p)Br(q)I(1−p−q)]n, in which the situation will preferably be:

between 0 and 0.3, q between 0 and 0.8 and p+q between 0.1 and 0.8, more particularly p=0 and q is between 0.35 and 0.55.

Consequently, in addition to the orange color not possessed by pure bismuth vanadate, the intimate mixing of the two compounds $BiVO_4$ and BiOX gives the pigment of the invention [BiV(1−n)XnO(4−3n)], which has durabilities (especially to light) which are improved with respect to the known properties alone of the compounds $BiVO_4$ and BiOX used alone.

In the case where n=1, the compounds present are bismuth oxyhalides BiOX, such as disclosed in U.S. Pat. No. 4,252, 570, exhibiting white, yellow, orange and red colors according to the respective contents of various halogens. These contents are given by the coefficients p and q in the following formula BiOCl(p)Br(q)I(1−p−1), preferably with p=0.

In this case, the greater the content of iodine, the more the color tends towards orange and reddish. Often, q is taken between 0.35 and 0.55 and preferably between 0.40 and 0.45.

In the case where n=0, the compound present is pure bismuth vanadate $BiVO_4$ (PY184) with a greenish yellow color.

Another aspect of the present invention relates to a pigment having the abovementioned general formula where n=1, that is to say a bismuth oxyhalide BiOX, stabilized and coated with additional protective layers, that is to say comprising one or more successive coating deposits based on oxides, hydroxides, hydrates, carbonates, phosphates, borates, molybdates and/or silicates of elements from Groups II, III and IV (IIIa, IIIb, IVa and IVb) of the Periodic Table, in particular on various compounds based on titanium, aluminum, calcium, zinc, rare earth metals and/or silicon.

The pigments of the invention advantageously corresponding to the abovementioned general formula can also comprise one or more stabilizing or coating layers composed of one or more successive deposits of these said oxides, hydroxides, hydrates, carbonates, phosphates, borates, molybdates or silicates of elements from Groups II, III and IV, in particular those mentioned above.

Said pigments can comprise one or more layers particularly suited to improving the resistances to light, to weathering and to heat of pigments, in particular a final layer based on zinc and boron which makes it possible to improve the resistance to heat and which makes possible its application in materials subjected to high temperatures.

The various inorganic compounds used in the coating layers of the invention can also be prepared from other preferred elements, such as titanium, aluminum, zinc, antimony, silicon, boron, calcium, zirconium, niobium, rare earth metals, in particular cerium, lanthanum, neodymium, praseodymium, samarium or yttritim, or a mixture of these. The proportion (calculated with respect to the total weight of the pigment obtained) of the coating layer or layers is generally between about 1 l and about 30% (wt) (compared to the total wt composition being 100%).

Another aspect of the present invention relates to a process for the manufacture of the pigments of the invention, which is carried out by precipitating bismuth oxyhalides from an acidic bismuth nitrate solution and from a basic solution of alkaline halides. The precipitate obtained is subsequently treated by means known per se to a person skilled in the art for rendering it fine and crystalline. Simultaneously, a pure bismuth vanadate is prepared; the two precipitates are mixed in an aqueous medium, which two precipitates are intimately combined, and homogeneous pigmentary particles are thus formed. The various compounds are present in proportions so as to correspond to the preferred compounds of the invention identified in the above formulae. Preferably, said particles formed are subsequently coated with one or more stabilizing (or coating) layers as defined above. Bismuth-based pigments are thus obtained with an orange yellow color which are very durable, which are very easy to disperse and which can be used to color both plastics and paints of all kinds. The coating of the pigmentary particles is carried out according to the well known process for stabilizing bismuth pigments, for example by the successive deposition of the various coating layers, as mentioned above, or preferably carried out according to the process disclosed in European Patent Application 99 870 193.2, incorporated below by reference.

According to a preferred embodiment of the invention, an orange bismuth oxyhalide is precipitated by bringing together two solutions: the first is acidic and comprises a bismuth salt, generally nitrate; the second is basic and comprises alkaline halides, for example alkali metal chloride, bromide or iodide; the sodium or potassium salts are preferably taken. The bismuth oxyhalide precipitate acquires a pigmentary value if it is left to mature by stirring in an acidic medium and prolonged standing (about 1 to about 20 hours). Subsequently, it can be slightly stabilized by depositing a fine inorganic layer of aluminum phosphate at its surface.

A greenish yellow bismuth vanadate precipitate is also manufactured by reaction of an acidic bismuth salt (generally bismuth nitrate) in the presence of a pentavalent vanadium salt (for example according to the description of Patent WO 94/01497).

When the bismuth vanadate is formed at a pH of the order of about 7.0, the bismuth oxyhalide slurry prepared previously is added and stirring is continued at approximately 90° C. for a period of time preferably between about 10 and about 180 minutes. A suspension of very homogeneous orange yellow particles, formed by the intimate combination of the bismuth vanadate and the bismuth oxyhalide, is then obtained.

The pigment obtained can be isolated, but it is preferably subsequently coated with protective and stabilizing layers in order to obtain an orange yellow pigment exhibiting optimum durabilities. The protective layers are those commonly used for inorganic pigments and especially for bismuth vanadates. Successive precipitations are carried out of inorganic compounds deriving from elements from Groups II, III and IV.

The best results are obtained with oxides, hydroxides, phosphates, silicates or molybdates of calcium, zinc, rare earth metals, aluminum, titanium or silicon. In order to obtain optimum deposition, the pigmentary suspension is finally neutralized to a pH of about 7; the pigment is isolated by filtration, washing with water, drying in a conventional way (100 to 400° C.) and final milling.

Use may be made, as trivalent bismuth salt, of bismuth nitrate, bismuth carbonate, bismuth acetate and any other solution of these salts sufficiently acidified in order not to be hydrolyzed. Use is generally made of an aqueous solution of bismuth nitrate $Bi(NO_3)$ $3.5H_2O$ in nitric acid.

Use may be made, as vanadium source, of combinations of pentavalent vanadium, such as, for example, the oxide, $V_2O_5$, or vanadates, $Na_3VO_4$, $NaVO_3$ or $NH_4VO_3$.

Alkali metal derivatives are used as source of halides; use is made in particular of ammonium, sodium or potassium chlorides, bromides and iodides: $NH4Cl$, $NH_4Br$, $NaCl$, $NaBr$, $NaI$, $KCl$, $KBr$ or $KI$, and preferably potassium iodide and potassium bromide.

Use is mainly made, as source of aluminum phosphate, of aluminum sulfate, chloride or nitrate and alkaline aluminates, on the one hand, and phosphoric acid and alkaline phosphates (alkali metal mono-, di-, tri-, pyro- or metaphosphates), on the other hand.

Use is in particular made, as molybdenum source, of sodium molybdate, $Na_2MoO_4.2H_2O$, or ammonium molybdate, $NH_46MO_7O_{24}.4H_2O$.

Any soluble salt, such as, for example, the chloride, $CaCl_2.2H_2O$, the nitrate, $Ca(NO_3)_2.4H_2O$, and the acetate, $Ca(CH_3COO)_2.H_2O$, can be taken as calcium source.

Another advantage of the pigments of the invention is their ease of use, for example in powdered paints, and their excellent dispersibility in colored formulations.

A final aspect of the present invention relates to a method of coloring of industrial coatings, in particular, resins, lacquers and/or plastics comprising the step of adding the pigments of the invention to said coatings.

The following examples serve to illustrate the various nonlimiting aspects of the invention.

EXAMPLES

Example 1

8.06 g of bismuth nitrate, originating from an acidic solution comprising 22.6% (wt) $(Bi(NO_3)_3$ of $Bi(NO_3)_3$, are run into a 400 ml reactor. The volume is adjusted to 100 ml by addition of water and a 10% aqueous solution comprising 2.03 g of potassium iodide, KI, and 0.97 g of potassium bromide, KBr, with 1.8 g of sodium hydroxide is run in over 30 min. Stirring is subsequently continued for 5 h and the mixture is allowed to stand overnight, i.e. for ±15 hours. The mixture is resuspended and two dilute aqueous solutions, the first comprising 0.55 g of aluminum sulfate and the second comprising 0.35 g of sodium phosphate, are run in successively. Finally, the mixture is neutralized to a pH of about 7.5 with a 10% aqueous sodium carbonate solution. The mixture is stirred for 30 min at pH=7.5. A pigmentary suspension of bismuth oxyiodobromide, with the chemical composition BiOI 0,6 Br 0,4, is obtained.

A bismuth vanadate, $BiVO_4$, is simultaneously prepared: 18 g of a bismuth nitrate solution (acidic solution comprising 22.6% wt of $Bi(NO_3)_3$ are run into a one liter reactor. The volume is adjusted to 100 ml by addition of water and a basic solution comprising 5.3 g of ammonium metavanadate, $NH_4VO_3$, the volume of which has been brought to 250 ml by addition of water, is added over 45 min. The pH is subsequently raised to about 7 by addition of a sodium hydroxide solution. The temperature is subsequently brought to about 85° C. over 30 min. The mixture is stirred for 30 min while maintaining the temperature at about 85° C. and the pH at about 7. When the pH begins to rise slightly (pH=7.15), stirring is carried out for a further 30 min.

At this point, the pigmentary suspension of bismuth oxoiodobromide, with the composition [BiOI 0,6 Br 0,4], is added and stirring is continued for 1 h while maintaining the temperature at 85° C.

Subsequently, the 10% aqueous solutions comprising:
a) 0.5 g of sodium molybdate
b) 1.0 g of aluminum sulfate
c) 0.3 g of calcium chloride
d) 0.7 g of sodium phosphate are successively added.

Finally, neutralization is carried out with a 10% aqueous solution comprising 3 g of sodium carbonate. After filtering, washing with water, drying and milling, an orange yellow pigmentary powder is obtained.

Example 2

48.06 g of bismuth nitrate, originating from an acidic solution comprising 22.6% (wt) of $Bi(NO_3)_3$, are run into a 2 l reactor. The volume is adjusted to 500 ml by addition of water and a 10% aqueous solution comprising 11.11 g of potassium iodide and 6.52 g of potassium bromide with 10.65 g of sodium hydroxide is run in over 45 min. Stirring is continued for 5 h and the mixture is allowed to stand overnight. The mixture is resuspended and two dilute aqueous solutions, the first comprising 3.25 g of aluminum sulfate and the second 2.135 g of sodium phosphate, are run in. The mixture is neutralized to a pH=7.5 with a 10% aqueous sodium hydroxide solution. Stirring is carried out for a further 30 min at pH 7.5. A pigmentary suspension of [lacuna] oxyiodobromide, with the chemical composition BiOI 0,55 Br 0,45, is obtained.

Bismuth vanadate is manufactured simultaneously: 106.6 g of bismuth nitrate (acidic solution comprising 22.6% (wt) of $Bi(NO_3)_3$) are introduced into a 5 l reactor. The volume is adjusted to 750 ml by addition of water and a basic solution comprising 31.4 g of ammonium metavanadate, the volume of which has been brought to 1500 ml by addition of water, is added over about 45 min. The pH is subsequently brought to about 7 by addition of a 10% sodium hydroxide solution. The temperature is then brought to about 85° C. for about 1 hour. Stirring is carried out for about 30 min while maintaining the temperature and the pH. When the pH begins to rise slightly, stirring is carried out for a further 30 min.

The pigmentary suspension of bismuth oxoiodobromide, with the composition [BiOI 0,55 Br 0,45], is then added and stirring is carried out for about 1 hour while maintaining the temperature at about 85° C.

The 10% aqueous solutions comprising:
a) 2.2 g of ammonium molybdate
b) 6.0 g of aluminum sulfate
c) 1.85 g of calcium chloride
d) 4.0 g of sodium phosphate are successively added.

Neutralization is carried out with a 10% aqueous sodium carbonate solution. After filtering, washing with water, drying and milling, a light orange yellow pigmentary powder is obtained.

Example 3

The procedure of Example 1 is used to prepare a bismuth oxoiodobromide with the chemical composition [BiOI 0,6 Br 0,4]. 9.94 g of bismuth nitrate, originating from an acidic solution comprising 22.6% of $Bi(NO_3)_3$, are run into a 500 ml reactor. The volume is adjusted to 150 ml by addition of water and a 10% aqueous solution comprising 2.50 g of potassium iodide and 1.12 g of potassium bromide with 2.15 g of sodium hydroxide is run in over 30 min. Stirring is subsequently continued for about 5 hours and the mixture is allowed to stand overnight. The mixture is resuspended and two dilute aqueous solutions, the first comprising 0.68 g of aluminum sulfate and the second comprising 0.43 g of sodium phosphate, are run in successively. Finally, the mixture is neutralized to a pH of about 7.5 with a 10% aqueous sodium carbonate solution. The mixture is stirred for about 30 min at pH=7.5. A pigmentary suspension of bismuth oxoiodobromide, with the chemical composition [BiOI 0,6 Br 0,4], is obtained.

A bismuth vanadate, $BiVO_4$, is also prepared: 28.8 g of a bismuth nitrate solution (comprising 22.6% of $Bi(NO_3)_3$ are run into a 2 liter reactor. The volume is adjusted to 200 ml by addition of water and a basic aqueous solution comprising 13.33 g of sodium vanadate, $Na_3VO_4$, the volume of which has been brought to 350 ml by addition of water, is added over 45 min. The pH is subsequently brought to about 7 by addition of sodium hydroxide. The temperature is then raised to about 90° C. over about 45 min. The mixture is stirred for about 30 min while maintaining the temperature and the pH (t=85° C., pH=7). When the pH begins to rise slightly, stirring is carried out for a further 30 min.

The pigmentary suspension of bismuth oxoiodo-bromide with the composition [BiOI 0,6 Br 0,4] is added and stirring is continued for 1 h while maintaining the temperature at about 90° C.

Subsequently, the 10% aqueous solutions comprising:
a) 0.77 g of sodium molybdate
b) 1.50 g of aluminum sulfate
c) 0.48 g of calcium chloride
d) 1.01 g of sodium phosphate are successively added.

Finally, the mixture is neutralized with a 10% aqueous sodium carbonate solution. After filtering, washing with water, drying and milling, a light orange yellow pigmentary powder is obtained.

Example 4

(Pigment with n=1)

44.75 g of bismuth nitrate, originating from an acidic solution comprising 22.6% of $Bi(NO_3)_3$, are run into a 2 liter reactor. The volume is adjusted to 750 ml by addition of water and a 10% aqueous alkaline solution comprising 8 g of potassium iodide, KI, and 7.75 g of potassium bromide, KBr, is run in over 1 h. Stirring is continued for about 6 hours and the mixture is subsequently allowed to stand overnight. The mixture is resuspended and two dilute aqueous solutions, the first comprising 3 g of aluminum sulfate and the second 2 g of sodium phosphate, are run in successively. The mixture is neutralized to a pH of about 6.5 with a 10% aqueous sodium hydroxide solution. Stirring is carried out for a further 1 h and the pigment obtained is coated with several protective layers, preferably according to the procedure described in the above examples. After filtering, washing with water, drying and milling, an orange yellow pigmentary powder is finally obtained.

Example 5

(Application in a solvent-based paint)

The following are weighed out in a small 100 ml pot:
15 g of a binder solution
45 g of glass beads with a diameter of 3 mm
15 g of pigment.
This mixture is shaken for one hour in a dispersing device (Skandex)®.
After this dispersing operation, the paste is cooled to room temperature and the following is added thereto:
30 g of supplementary binder
The mixture is again stirred in a Skandex for about 5 minutes.
Binder solution: short oil alkyd resin, without air drying fatty acids, in solution in xylene.
Supplementary binder (comprising 56.5% of dry matter): mixture of short oil alkyd resin and of melamine resin, in a ratio 75:25, in solution in a 30/70 mixture of xylene/Solvesso 100®.
The paint thus prepared is then applied to a metal test specimen and stoving is carried out in a ventilated oven for about 30 minutes at about 120° C.
Plaques with an orange yellow color are thus obtained with the pigments of the preceding examples. The test of exposure to "QUV" light for 200 hours gives the following results.

TABLE I

| Delta E* obtained by spectrocolorimetric measurement | |
|---|---|
| Pigment | Delta E* |
| Pigment according to the invention (1 − n) {BiVO4}.n{BIOX} | 1.10 |
| BiOX (Example 4) | 4.55 |
| P.Y.184 BiVO$_4$ | 1.56 |

The resistance to light improves as delta E* becomes smaller.

Example 6

(Application in a powdered paint)

A homogeneous mixture of:
637.0 g of polyester resin
49.0 g of TGIC (triglycidyl isocyanurate)
10.5 g of flow agent
3.5 g of degassing agent
300.0 g of pigment is prepared.
This mixture is introduced into a twin-screw extruder rotating at 450 rev/min. The temperature therein is adjusted to from 90 to 95° C. The extruded and cooled product is milled in a micronizer rotating at 13,000 rev/min and is passed through a fine sieve (100 μm). The powder is subsequently applied to a metal test specimen by electrostatic spraying (corona) and stoving is carried out for about 10 min at about 200° C. A plaque covered with a colored film of paint is thus obtained.
If it is desired to produce a graduated shade, the 300 g of pigment are replaced in the formula by: 30 g of pigment+270 g of titanium dioxide.

Plaques with an orange yellow color are obtained with the pigments of the invention. Their durability to light is excellent; the test of exposure to "EMMAQUA" for 55 days gives the following results (cf. Table II).
The resistance to light improves as delta E* becomes smaller.

TABLE II

| Delta E* obtained by spectrophotocolorimetric measurement | | |
|---|---|---|
| | Pigment/TiO$_2$ ratio = 100/0 | Pigment/TiO$_2$ ratio = 10/90 |
| Pigment according to the invention | 0.21 | 0.38 |
| P.Y.184 BiVO$_4$ | 1.09 | 1.82 |
| P.Y.139 isoindoline yellow | 1.61 | 3.07 |
| P.Y.170 diarylide yellow | 6.13 | 19.73 |

This exceptional durability is never obtained with other (organic) pigments with an orange yellow color (cf. Table II above).

Example 7

(Preparation of an orange yellow pigment coated with silica)

100 g of pigment manufactured according to Example 1 are added with stirring to a disperser comprising 0.75 l of water. Stirring is carried out very vigorously for about 2 to about 3 h in order to obtain good dispersion of the pigment.
This suspension is placed in a 5 liter reactor and the volume is adjusted to 3 liters by addition of hot water. The temperature is brought to 90° C. with constant stirring and the pH is adjusted to a value of 9. The temperature of about 90° C. is maintained throughout the preparation.
A basic aqueous sodium silicate solution (comprising 25 g of SiO$_2$) is subsequently added over 30 min. After having stirred for 30 min, the pH being equal to 10, a dilute 3.7% aqueous sulfuric acid solution is run in dropwise over 4 hours. Care is taken that the pH of the suspension is not less than 6.5–7.0 and stirring is carried out for a further 30 min. 10 g of zinc nitrate Zn(NO$_3$)$_2$.6H$_2$O, in 100 ml of water, and 9.6 g of sodium tetraborate Na$_2$B$_4$O$_7$.10H$_2$O (borax) are then successively added. Care is taken that the pH is in the region of 7.0 and stirring is carried out for a further 30 min.
After filtering, washing, drying and milling, an orange yellow bismuth pigment is obtained which has an external silica layer, this layer being coated with zinc and boron (25 to 30%).

Example 8

(Preparation of an orange pigment coated with silica)

50 g of pigment manufactured according to Example 4 are dispersed in 400 ml of water with vigorous stirring for 3 hours. This suspension is poured into a reactor and the volume is adjusted to 2 l by addition of water. The temperature is brought to 85° C. and the pH is adjusted to a value of about 9. The temperature and the stirring are maintained throughout the preparation.

A basic aqueous sodium silicate solution (comprising 55 g of silica) is subsequently added for 30 min. After having stirred for about 30 min, the pH being equal to 10, a dilute 3.7% aqueous sulfuric acid solution is run in dropwise over 4 h. Care is taken that the pH of the suspension does not fall below a value of 6.5 and stirring is carried out for a further 30 min.

5 g of zinc nitrate, in 50 ml of water, and 3.12 g of boric acid are then successively added. Care is taken that the pH is about 7 and stirring is carried out for a further 30 min.

After filtering, washing, drying and milling, an orange bismuth-based pigment is obtained which has an external silica layer, this layer being coated with zinc and boron (25 to 30%).

Example 9

(Application in plastics)

The resistance to heat of the pigments prepared according to the present invention is measured in the following way:

A preblend is prepared by blending 60% of pigment based on bismuth vanadate with 30% of linear low density polyethylene (for example LL6201RQ® from Exxon) and 10% of polyethylene wax (for example AC8A®). This preblend is poured into a twin-screw extruder (for example Collin®) rotating at 300 rev/min and heated to 150° C. The combined contents are extruded, cooled and granulated. A masterbatch is thus obtained and diluted in high-density polyethylene (for example Eltex A4090®) in order to obtain granules of dilute masterbatch with a degree of pigmentation of 0.5%.

Subsequently, the granules are passed into an injection molding press at temperatures varying from 200° C. to 300° C. or more, with retention times of 30 sec at 200° C. and of 5 minutes at 200°, 210°, 220°, . . . , 300° C. or more. The injection is carried out in a mold which provides colored plastic test specimens, the darkening of which is determined by spectrophotocolorimetric measurement, the test specimen of 30 sec at 200° C. being taken as comparison standard. The resistance temperature is obtained when the threshold of dE*=3.0 units is exceeded (DIN 53772).

The values in Table III illustrate the resistances to heat of a pigment according to the invention (Example 7), of a bismuth oxyhalide (Example 8) and of a bismuth vanadate which are similarly treated with silica.

It is seen that the resistance to heat of a pigment according to the invention is approximately 300° C.

TABLE III

Delta E* obtained by spectrophotocolorimetric measurement

| Pigment | Delta E* at 250° C. | Delta E* at 260° C. | Delta E* at 270° C. | Delta E* at 280° C. | Delta E* at 290° C. | Delta E* at 300° C. |
| --- | --- | --- | --- | --- | --- | --- |
| Example 7 | 0.81 | 1.43 | 1.54 | 1.86 | 2.54 | 3.10 |
| Example 8 | 1.50 | 2.70 | 3.13 | 3.92 | 5.38 | — |
| BiVO4 [sic] (PY184) treated with silica | — | 0.65 | 0.78 | 1.40 | 1.90 | 2.90 |

What is claimed is:

1. Bismuth-based inorganic pigments with a light vivid yellow to orange color, comprising the following general formula:

$BiV_{(1-n)}X_nO_{(4-3n)}$ wherein X is a halogen or a mixture of halogens and n is between 0 and 1.

2. The pigments according to claim 1, wherein X is a halogen or a mixture of halogens selected from the group consisting of chlorine, bromine and iodine in the ratio:

$[Cl_{(p)}Br_{(q)}I_{(1-p-q)}]_n;$ wherein n is between 0 and 1,
wherein p is between 0 and 0.3,
wherein q is between 0 and 0.8,
and wherein p+q is between 0.1 and 0.8.

3. The pigments according to claim 1 further comprising:
one or more successive layers of a coating based on one compound selected from the group consisting of: oxides, hydroxides, hydrates, phosphates, borates, molybdates and silicates of elements from Groups II, III and IV of the Periodic Table.

4. A process for producing pigments according to claim 1, comprising the following steps:
precipitating a bismuth nitrate solution using an aqueous solution comprising halide(s) to obtain a precipitate of bismuth oxyhalides;
forming a pure bismuth vanadate precipitate by reaction of an acidic bismuth nitrate solution with a basic aqueous solution comprising at least vanadate ions;
mixing said bismuth vanadate precipitate and said precipitate of bismuth oxyhalides in an aqueous medium to obtain a suspension of homogeneous pigmentary particles;
separating the pigmentary particles from the aqueous liquors, and washing drying and milling said pigmentary particles.

5. The process according to claim 4, wherein the mixing is carried out by stirring the aqueous solution for about 30 minutes to about 1 hour 30 minutes.

6. The process according to claim 5, wherein the stirring is carried out at a temperature between about 70° C. and about 100° C.

7. The process according to claim 5, wherein the stirring is carried out at a pH of about 7.

8. The process according to claim 4, wherein the precipitation of the bismuth oxyhalide is carried out at a temperature of between about 15 and about 90° C.

9. The process according to claim 4, wherein the formation of the bismuth vanadate precipitate is carried out at a temperature between about 20 and about 100° C.

10. The process according to claim 4, wherein that the precipitation of the bismuth oxyhalide is carried out at a final pH between about 6.5 and about 7.5.

11. The process according to claim 4, wherein the formation of the bismuth vanadate precipitate is carried out at a final pH between about 6.5 and about 7.5.

12. A method of coloring plastics, paints, or lacquers comprising adding the pigment according to claim 1 to said plastics, paints or lacquers.

13. The pigments of claim 2 wherein n is between 0.25 and 0.40.

14. The pigments of claim 2 wherein p is equal to 0 and q is between 0.35 and 0.55.

15. The pigment according to claim 3 wherein the elements are selected from the group consisting of: titanium, aluminum, calcium, zinc, rare earth metals and silicon.

16. The process of claim 4 wherein said halide(s) are bromide and/or iodide.

17. The process of claim 4 further comprising coating said pigmentary particles with one or more successive coating deposits based on oxides, hydroxides, hydrates, carbonates, phosphates, borates, molybdates and silicates of elements from Groups II, III, and IV of the Periodic Table.

18. The process of claim 4 wherein said basic aqueous solution further comprises ions selected from the group consisting of: phosphate, silicate, molybdate and tungstate ions.

* * * * *